United States Patent Office 3,694,224
Patented Sept. 26, 1972

3,694,224
TORTILLA AND PROCESS USING POLYCARBOXYLIC ACIDS AND THEIR ANHYDRIDES
Manuel Jesus Rubio, Bridgeport, Conn., assignor to Roberto Gonzalez Barrera, Monterrey, Mexico
No Drawing. Filed July 24, 1970, Ser. No. 58,139
Int. Cl. A23l 1/10, 1/00
U.S. Cl. 99—80 R        18 Claims

ABSTRACT OF THE DISCLOSURE

To retard the staling and retard microbiological spoilage of tortillas, which are an unleavened unshortened food product made from nixtamalized corn or corn flour by incorporating an additive in making the tortilla dough. The additive is an aliphatic polycarboxylic acid or its anhydride having 3 to 6 carbon atoms in its carbon chain.

DISCLOSURE OF INVENTION

The present invention relates to retarding the staling of tortillas and retarding microbiological spoilage of tortillas.

Many expedients which apply for preventing staling to the usual wheat, whole wheat, or rye bread commonly eaten, are not effective when applied to tortillas because of the marked differences in their composition from the breads mentioned above. Among these differences are:

(1) Tortillas are made from whole corn, that is, corn which contains its germ, hull, bran, etc. Bread is made from dehulled, degermed and debranned wheat.
(2) Dehulled, degermed, debranned wheat used in making bread undergoes no chemical treatment before grinding. Whole corn used in making tortillas always undergoes the chemical treatment of steeping in limewater at pH 12 before grinding.
(3) Dehulled, degermed, debranned wheat used in making bread is ground into a flour in the dry state. Steeped whole corn used in making tortillas is ground into a dough in the wet state, after which the dough is either dried into a flour or used directly to make tortillas.
(4) The dough used for making bread is always prepared from dry dehulled, degermed, debranned wheat flour. The dough used for making tortillas may be prepared either from dry limed whole corn flour or directly by grinding whole corn steeped in limewater at pH 12.
(5) In addition to dehulled, degermed, debranned wheat flour, the dough used for making bread always contains some of the following ingredients: shortening, a leavening agent (yeast, air, or baking powder), salts, sugar, milk solids or milk, eggs or egg solids, and water. Dough used in making tortillas only contains ground limed whole corn and water.
(6) The final moisture content of bread after baking is approximately 20%; that of tortillas after cooking is approximately 45%. Due to its lower moisture content, bread is much less subject to microbial spoilage than tortillas.
(7) Bread is baked inside an oven by hot air at a temperature of 425–500° F. for 30–60 minutes. Tortillas are cooked on a hot plate at 290–410° F., each side or face being exposed alternately to the heat for 15–20 seconds, after which the first side is again exposed for an additional 15–20 seconds.
(8) Other differences between bread and tortillas are the following:
(a) Dehulled, degermed, debranned wheat flour used in breadmaking is usually bleached; limed corn flour used for making tortillas is never bleached.
(b) Bread is usually leavened; tortillas are never leavened.
(c) Bread is always baked in the shape of loaves or rolls; tortillas are always shaped in the form of round, flat discs.
(d) The structure of bread is largely due to the presence of proteins known as "glutelin and gliadin" which are components of dehulled, degermed, debranned wheat. Corn contains no such protein, so that the structure of tortillas is due mostly to their starch component.

The base material for making tortillas is limed corn dough, whose preparation is described below.

Flat discs of dough of diameter 4–6 inches and height 2–3 millimeters are prepared either by hand, by use of any mechanical equipment which squashes or presses pieces of dough, or by any suitable automatic machine.

After they have been made, the flat discs of dough are cooked on a hot plate whose temperature varies from 290–410° F. In the cooking process, each face or side of the disc is alternately exposed to the heat for 15–20 seconds, after which the first side is again exposed for an additional 15–20 seconds.

The cooked discs or tortillas have a moisture content of 40–48% and are ready to eat.

Limed corn dough may be prepared from limed corn flour of size smaller than 45 U.S. Standard Mesh, 8–12% moisture content and pH 6–7. The dough is made by mixing 1.0–1.4 pounds of tap water per pound of flour.

Limed corn dough may also be made directly by grinding corn which has been steeped in limewater. In such case 1 pound of corn is steeped overnight in 0.5–0.8 pound of water, initially at boiling temperature, which contains 0.5–1.5% calcium hydroxide. It should be noted that when the corn is added to the limewater, the latter is either at or close to its boiling temperature. However, after both ingredients have been mixed, no further heat is applied so that the temperature of the mixture drops gradually during the steeping process.

It might be mentioned that tortillas, when normally prepared as described herein and without additives of any kind, have a maximum shelf life of 12–15 hours. After such time they are spoiled by microorganisms and become hard or stale.

It is known that tortillas when kept under conditions in which no moisture is lost, nevertheless become hard and inflexible with the passage of time and break or crumble easily when flexed or bent. This effect increases with time. Freshly made tortillas are very flexible but lose their flexibility with the passage of time. Hardening is appreciable after twenty-four hours, marked after forty-eight hours and almost complete after seventy-two hours if the product is kept at room temperature. It should be noted that the hardening or staling effect increases with decreasing temperature until the freezing point of water in the product is reached. At temperatures below room temperature but above the freezing point of water in the tortillas, therefore, hardening proceeds at a faster rate than at room temperature and vice-versa.

In determining the flexibility index a tortilla is bent around a bar of known radius, and this is tried with successively smaller bars until a bar is found which is the smallest around which the tortilla just breaks when it is flexed. A more flexible tortilla will just break when it is bent around a smaller bar than a less flexible tortilla. A higher flexibility index corresponds therefore to bars of lower radii and indicates higher flexibility.

Table 1 gives typical values for variation of the flexibility index of tortillas with time at room temperature.

TABLE 1

Variation of the Flexibility Index of Tortillas With Time at Room Temperature

| Flexibility Index after the following elapsed time— | | | | |
|---|---|---|---|---|
| 0 hr. | 24 hr. | 48 hr. | 72 hr. | 96 hr. |
| 8.5 | 7.7 | 6.5 | 6.0 | 5.5 |

Hardening or loss of flexibility of tortillas is believed to be due to a physico-chemical change in the starch constituent of tortillas which is known as retrogradation. This phenomenon has been studied in substances other than tortillas and is described in the technical literature (Whistler 1965).

The additive of the present invention imparts the property of retarding the loss of flexibility of tortillas with time. It must be mixed with the dough used for making tortillas, although as later explained, the mixture may be achieved in various ways.

Thus, in respect to this aspect of the invention, tortillas stored under conditions in which no moisture is lost from them become stale more slowly because of the additive of the invention, which retards hardening with time, retards loss of flexibility with time, increases the freshness of the tortillas, prolongs the flexible shelf life of the tortillas and increases the freshness of both freshly made tortillas and also reheated tortillas.

Microbiological spoilage

One aspect of the invention is to prevent or retard microbiological spoilage of tortilla dough and tortillas made from limed corn and/or limed corn flour.

It is known that limed corn dough and tortillas because of their relatively high moisture content, are very susceptible to attack and spoilage by bacteria, yeasts, molds and other microorganisms. Limited corn dough has a higher moisture contest than tortillas and is more susceptible to such spoilage.

TABLE 2

Typical Moisture Contents and Shelf Lives at 25° C. for Limed Corn Dough and Tortillas Without Additives of Any Kind

| Product | Moisture content, percent | Shelf life at 25° C., hr. |
|---|---|---|
| Dough | 55-60 | 6 |
| Tortillas | 42-48 | 12 |

Table 2 gives typical moisture contents and shelf lives for limed corn dough and tortillas.

The shelf life is the time required to detect unmistakable signs of microbiological spoilage in the product. In limed corn dough and tortillas these signs include production of off-flavors and odors, production of "rope" (a polysaccharide resulting from the growth of certain bacteria such as $B.\ mesentericus$) and appearance of moldy spots. Obviously, the shelf life of a product depends upon the temperatures at which it is stored. The higher temperatures normally correspond with lower shelf lives and vice versa. Also, the type of spoilage which first occurs depending upon the temperature. In limed corn dough and tortillas the first signs of spoilage at higher temperatures (above 30° C.) usually produce off-flavor due to the growth of bacteria. At lower temperatures (below 30° C.) the first signs are the appearance of moldy spots.

TABLE 3

Typical Shelf Lives of Limed Corn Dough and Tortillas at Different Temperatures

| Product | Storage temperature ° C. | Shelf life, hr. |
|---|---|---|
| Dough | 37 | 3 |
|  | 25 | 6 |
|  | 15 | 12 |
| Tortillas | 37 | 6 |
|  | 25 | 12 |
|  | 15 | 18 |

Table 3 gives typical shelf lives of limed corn dough and tortillas at different temperatures.

The additives may all be incorporated in the following ways:

(1) They can be added to the dough as an aqueous solution, dispersion or suspension thoroughly mixed with the dough. Allowance is made for any water incorporated with them in the water to be used in the dough.

(2) If the dough is made from limed corn flour, the additive may be dissolved, suspended or dispersed in the water which is subsequently to be mixed with the flour to make the dough.

(3) In some cases it is preferable to mix the additive with the dry limed corn flour prior to mixing the flour with the water.

The additive is an acid which will lower the pH to 5.5 to 5 and which may be any edible organic or inorganic acid such as hydrochloric acid, sulphuric acid, citric acid and monocalcium phosphate in doses of from 0.01 to 4%.

This must be used with an agent which has the property of inhibiting microbiological spoilage, the other agent functioning as an enhancer. A typical description of the agent which can be used with the acid of the present invention is a lower fatty acid having from 1 to 4 carbon atoms, its anhydride, the sodium potassium or clacium salt thereof, or the sodium, potassium or calcium diacetates in doses of 0.01 to 0.8%. An example of the effect is given in Table 4.

TABLE 4.—EFFECT OF COMBINATIONS OF PROPIONIC AND CITRIC ACIDS IN INCREASING THE SHELF LIFE OF TORTILLAS AT 25° C.

| Additive combination and dose: | Shelf life, hours |
|---|---|
| 0.15% propionic acid + 0.10% citric acid | 60 |
| 0.15% propionic acid + 0.15% citric acid | 72 |
| 0.20% propionic acid + 0.05% citric acid | 72 |
| 0.20% propionic acid + 0.10% citric acid | 96 |
| Control I, 0.15% propionic acid alone | 36 |
| Control II, 0.20% propionic acid alone | 48 |
| Control III, no additive | 12 |

Polycarboxylic acids

Edible organic aliphatic polycarboxylic acids and their anhydrides having 3 to 6 carbon atoms in their carbon chain can to advantage be incorporated in tortilla dough in concentrations of 0.25 to 5%, preferably 0.25 to 2%, of the weight of the tortillas, and they increase the retention of flexibility when tortillas are stored without much loss of moisture. The results are shown in Table 5.

TABLE 5

Typical flexibility indices obtained by addition of different cross-bonding substances to tortillas

| Dose of additive based on weight of tortillas | Flexibility index after— | | | |
|---|---|---|---|---|
|  | 0 hr. | 24 hr. | 48 hr. | 72 hr. |
| Adipic acid, percent: | | | | |
| 0.5 | 8.6 | 7.6 | 6.7 | 6.3 |
| 1.0 | 8.8 | 8.3 | 8.0 | 7.8 |
| 2.0 | 9.3 | 8.8 | 8.6 | 8.2 |
| Control | 8.5 | 6.5 | 5.7 | 5.7 |

Typical examples of such acids and anhydrides are citric, succinic, adipic and glutaric acids and anhydrides.

EXAMPLE 1

Nixtamalized corn flour is mixed with water in a dough mixer, the water containing adipic acid dispersed therein to the extent of 2% of the tortillas. The product after cooking the tortillas produces the results shown in Table 5.

EXAMPLE 2

Dry powdered adipic acid is mixed with nixtamalized corn flour to the extent of 2% of the tortillas, and incorporated with 120 percent of water as above set forth in a dough mixer. The results are the same as those set forth in Table 5.

EXAMPLE 3

The procedure of Example 1 is followed except that citric acid is used. The results are similar to those obtained in Example 1.

EXAMPLE 4

The procedure of Example 1 is carried out except that citric anhydride is used. The results are similar to those obtained in Example 1.

EXAMPLE 5

In this example as shown in Table 4, the acid is used to maintain the pH and it is used with another agent to inhibit microbiological spoiling.

In view of my invention and disclosure, variations and modifications to meet individual whim or particular need will doubtless become evident to others skilled in the art, to obtain all or part of the benefits of my invention without copying the process and composition shown, and I therefore claim all such insofar as they fall within the reasonable spirit and scope of my claims.

Having thus described my invention, what I claim as new and desire to secure by Letters Patent is:

1. A tortilla essentially consisting of nixtamalized corn, or nixtamalized corn flour and 0.25 to 5% of an edible organic aliphatic polycarboxylic acid or its anhydride having 3 to 6 carbon atoms in its chain.
2. A tortilla of claim 1, in which the acid consists of adipic acid or its anhydride.
3. A tortilla of claim 1, in which the acid consists of succinic acid or its anhydride.
4. A tortilla of claim 1, in which the acid consists of citric acid or its anhydride.
5. A tortilla of claim 1, in which the acid consists of glutaric acid or its anhydride.
6. A tortilla essentially consisting of nixtamalized corn or nixtamalized corn flour, an edible acid in a dosage of 0.01 to 4% and an agent to inhibit microbiological spoilage of the class consisting of a lower fatty acid having from 1 to 4 carbon atoms in its carbon chain, its acid anhydride, its sodium, potassium and calcium salts, and the sodium, potassium and calcium diacetates in a dose of 0.01 to 0.8% of the weight of the tortilla.
7. A tortilla dough essentially consisting of nixtamalized corn or nixtamalized corn flour, water and 0.25 to 5% on the weight of the tortillas of an edible organic aliphatic polycarboxylic acid or its anhydride having 3 to 6 carbon atoms in its chain.
8. A tortilla dough of claim 7, in which the acid consists of adipic acid or its anhydride.
9. A tortilla dough of claim 7, in which the acid consists of succinic acid or its anhydride.
10. A tortilla dough of claim 7, in which the acid consists of citric acid or its anhydride.
11. A tortilla dough of claim 7, in which the acid consists of glutaric acid.
12. A tortilla dough essentially consisting of nixtamalized corn or nixtamalized corn flour, water and edible acid in a dosage of 0.01 to 4% and an additive which retards microbiological spoilage of the class consisting of lower fatty acids having from 1 to 4 carbon atoms in the carbon chain, the anhydrides thereof, sodium, potassium and calcium salts thereof, and the sodium, potassium and calcium diacetates in quantities between 0.01 and 0.8% of the weight of the tortilla.
13. A process of producing tortilla dough which makes tortillas which retain flexibility for an extended time when stored without loss of moisture, which comprises mixing together nixtamalized corn or nixtamalized corn flour with water to make tortilla dough and incorporating into the dough from 0.25 to 2% by weight of the tortillas of an edible organic aliphatic polycarboxylic acid or its anhydride having 3 to 6 carbon atoms in its carbon chain.
14. A process of claim 13, in which the acid material is a compound of a class consisting of adipic acid and its anhydride.
15. A process of claim 13, in which the acid material is a compound of the class consisting of succinic acid and its anhydride.
16. A process of claim 13, in which the acid material is a compound of the class consisting of citric acid and its anhydride.
17. A process of claim 13, in which the acid material is a compound of the class consisting of glutaric acid or its anhydride.
18. A process of producing tortilla dough which is resistant against microbiological spoilage, which comprises mixing together nixtamalized corn or nixtamalized corn flour with water to make tortilla dough, incorporating in the tortilla dough an edible acid in a dosage of 0.01 to 4% and incorporating in the dough an additive which prevents microbiological spoilage selected from the class consisting of lower fatty acids having from 1 to 4 carbon atoms in the carbon chain, the anhydrides thereof, sodium, potassium and calcium salts thereof and sodium, potassium and calcium diacetates in proportion of 0.01 to 0.8% of the weight of the tortilla.

References Cited

UNITED STATES PATENTS

| | | | |
|---|---|---|---|
| 2,584,893 | 2/1952 | Lloyd et al. | 99—93 |
| 2,704,257 | 3/1955 | De Sollano et al. | 99—93 |

OTHER REFERENCES

Zelayeta "Elena's Secrets of Mexican Cooking," Prentice-Hall, Inc., Englewood Cliffs, N.Y., 1962, pages 115–121.

RAYMOND N. JONES, Primary Examiner